D. CARSE.
VEHICLE BRAKE.
APPLICATION FILED JULY 26, 1916.
1,217,272.
Patented Feb. 27, 1917.
2 SHEETS—SHEET 2.
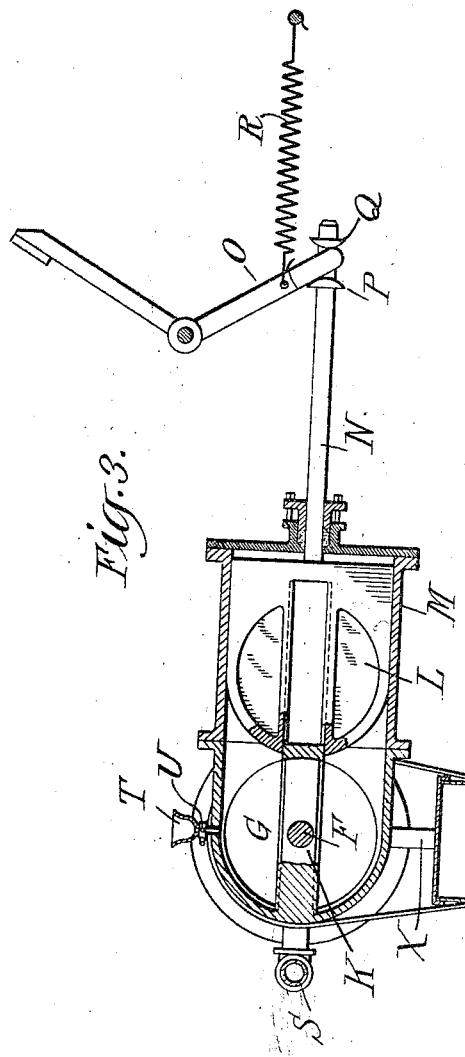
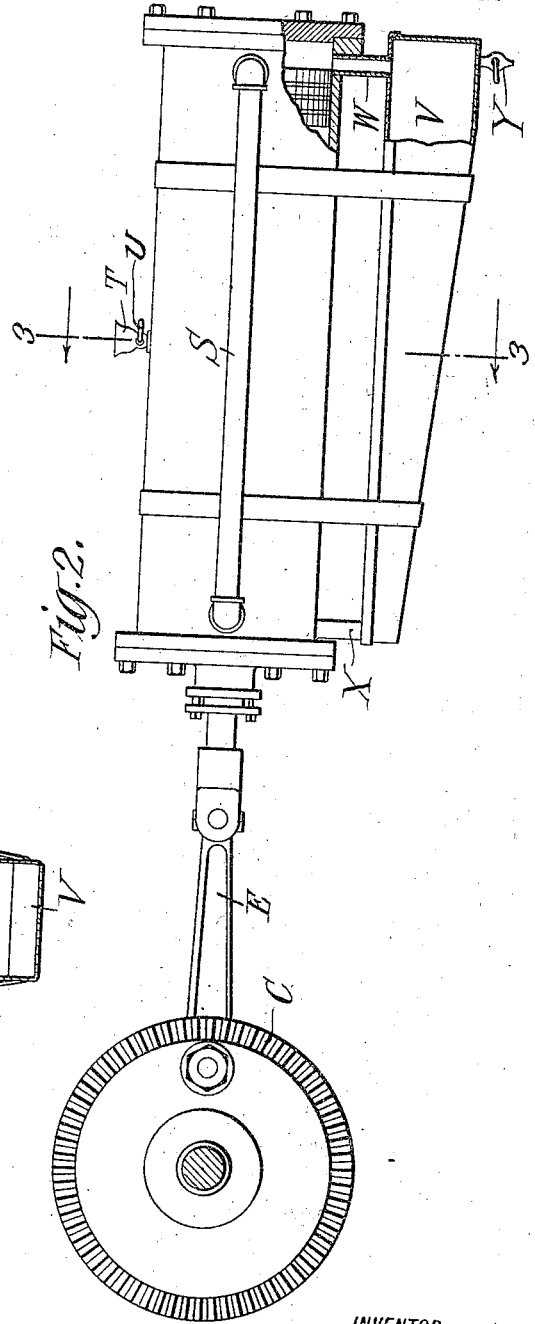
INVENTOR
Donald Carse
BY
L. Anthony Usina, ATTORNEY

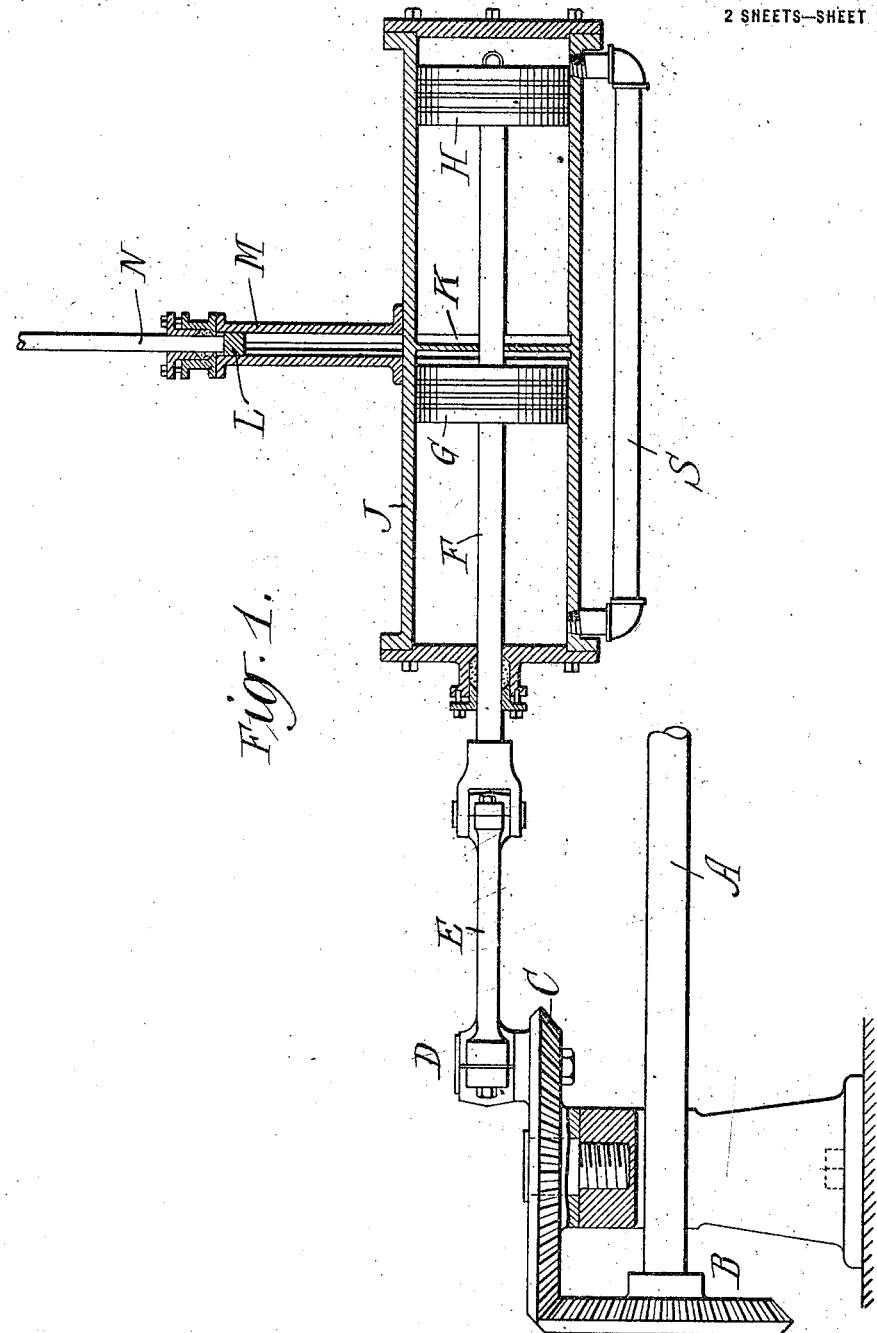

UNITED STATES PATENT OFFICE.

DONALD CARSE, OF RIVERDALE-ON-HUDSON, NEW YORK.

VEHICLE-BRAKE.

1,217,272.

Specification of Letters Patent.   Patented Feb. 27, 1917.

Application filed July 26, 1916.   Serial No. 111,520.

*To all whom it may concern:*

Be it known that I, DONALD CARSE, a citizen of the United States, residing in Riverdale-on-Hudson, New York, have invented certain new and useful Improvements in Vehicle-Brakes, of which the following is a specification.

My invention aims to provide certain improvements in vehicle brakes whereby the braking resistance is impressed upon the driving mechanism and can be operated with ease and certainty.

The accompanying drawing illustrates a machine embodying the invention, but it will be understood that the machine illustrated may be modified in detail and in the arrangement of the parts without departing from the invention.

Figure 1 is a part plan and part horizontal longitudinal section; Fig. 2 is a side elevation of the cylinder and connected parts and Fig. 3 is a cross-section through the valve.

Referring to the embodiment of the invention illustrated, the shaft A is the driving shaft of an automobile and carries a beveled gear B which drives a similar gear C carrying a crank pin D connected by a link E to a piston rod F which carries the usual pair of pistons G and H with the usual packing rings working in a cylinder J. The travel of the pistons carries them nearly to the opposite ends of the cylinder. The space between them is nearly filled with oil or other similar practically incompressible liquid, which is carried back and forth with the pistons in their normal operation.

The piston rod F passes through a guide rod K which serves also as a guide for a valve L located normally in a casing M and having a stem N which is engaged by a pedal O between a pair of shoulders P and Q. The valve is preferably a plate which is comparatively thick at its edges and has thinner panels surrounded by such thicker edge portions, as illustrated in Fig. 3. The pedal is pressed upward by a spring R with sufficient strength to hold the valve up in its casing and out of the cylinder.

When the brake is to be applied the operator depresses the pedal O which forces the valve L into the cylinder in the space between the two pistons and thus restricts to a greater or less degree the passage through which the oil can flow, and opposes a corresponding resistance to the movement of the pistons and to the operation of the driving shaft of the vehicle. By pressing the pedal all the way down the operator can put an absolute brake on the movement of the shaft.

The ends of the cylinder are closed to prevent admission of dust, and the air spaces at the opposite ends are connected by a pipe S so that the air can flow freely from one end to the other as the pistons are reciprocated and thus avoid back pressure on the pistons.

A small quantity of the oil may leak out from time to time and for renewing the supply an oil cup T is provided with a cock U through which additional oil can be passed into the cylinder. The leakage beyond the ends of the pistons is caught by a tank V connected by pipes W and X with the opposite ends of the cylinder on the lower side thereof, the tank V having an inclined bottom and having a cock Y at its lower end by which the oil can be drawn off as it accumulates. It can then be returned through the cup T to its proper place in the cylinder.

What I claim is—

1. A brake for vehicles comprising a cylinder, a pair of pistons therein driven from the driving shaft of the vehicle and having a supply of practically incompressible liquid between them and a valve adapted to be introduced into the space between the pistons to restrict the flow of such liquid.

2. A brake for vehicles comprising a cylinder, a pair of pistons therein driven from the driving shaft of the vehicle and having a supply of practically incompressible liquid between them and a valve adapted to be introduced into the space between the pistons to restrict the flow of such liquid, said cylinder having its ends closed and in communication with each other so as to keep out dust while avoiding back pressure on the pistons.

3. A brake for vehicles comprising a cylinder, a pair of pistons therein driven from the driving shaft of the vehicle and having a supply of practically incompressible liquid between them and a valve adapted to be introduced into the space between the pistons to restrict the flow of such liquid, and a drainage tank communicating with the opposite ends of the cylinder to collect any liquid leaking from between the pistons.

In witness whereof, I have hereunto signed my name.

DONALD CARSE.